United States Patent [19]
Bridgelall et al.

[11] Patent Number: 5,648,649
[45] Date of Patent: Jul. 15, 1997

[54] FLYING SPOT OPTICAL SCANNER WITH A HIGH SPEED DITHERING MOTION

[75] Inventors: Raj Bridgelall, Mount Sinai; Joseph Katz, Stony Brook, both of N.Y.

[73] Assignee: Symbol Technologies, Inc., Holtsville, N.Y.

[21] Appl. No.: 508,628

[22] Filed: Jul. 28, 1995

[51] Int. Cl.⁶ .................................................. G06K 7/10
[52] U.S. Cl. ......................................... 235/462; 235/467
[58] Field of Search ................................ 235/462, 467

[56] References Cited

U.S. PATENT DOCUMENTS

| | | | |
|---|---|---|---|
| 4,933,538 | 6/1990 | Herman et al. | 235/462 |
| 5,115,121 | 5/1992 | Bianco et al. | 235/467 |
| 5,168,149 | 12/1992 | Dvorkis et al. | 235/462 X |
| 5,235,167 | 8/1993 | Dvorkis et al. | 235/467 X |
| 5,545,887 | 8/1996 | Smith et al. | 235/462 |

*Primary Examiner*—Donald T. Hajec
*Assistant Examiner*—Jeffrey R. Filipek
*Attorney, Agent, or Firm*—Kirschstein, et al.

[57] ABSTRACT

An optical scanner includes a light source for producing a light beam for scanning a target wherein the light beam scans a target at a first low frequency and the beam also dithers in a direction orthogonal to the scanning direction at a second, high frequency. The dithering motion can be imparted by a oscillating mirror and allows improved reading of, for example, bar code symbols. In addition an optical scanner includes a laser light source producing a laser light beam into which a time-varying phase is introduced in order to reduce laser speckle noise.

14 Claims, 3 Drawing Sheets

FLYING SPOT OPTICAL SCANNER WITH A HIGH SPEED DITHERING MOTION

BACKGROUND OF THE INVENTION

1. Field of the Invention

The invention relates generally to flying spot optical scanners, and in particular to scanners capable of reading badly printed or dot matrix symbols.

2. Background Art

In known flying spot optical scanners using a linear or raster scanning pattern a field is scanned by traversing a scanner beam over a set of horizontal lines effectively covering the field. Problems often arise when the scanner is reading indicia such as bar code symbols where ink spread and voids have been introduced during the printing process, for example when the indicia includes dot matrix printed symbols, as well as dirty or damaged symbols. Such ink spread and voids may lead to errors or inaccuracies in reading the indicia.

Attempts have been made to solve this problem by varying the optical properties of the spot such that the scanner produces an elliptical spot having its longer axis in the vertical direction. Such an arrangement provides improved reading of indicia such as bar code symbols having vertical bars and spaces relative to the scanning direction.

Another problem associated with known optical scanners is the presence of speckle noise caused by laser speckle, an inherent property of a semiconductor laser diode spot beam, or by the interference of the laser scanning beam arriving at the target with the laser scanning beam reflected from the target, the interference taking place effectively at the surface of the target. Such a problem arises in particular with small detectors such as might be utilized in a two dimensional sensor array or CCD scanner into which the pixel size of a detector area is very small. In such an embodiment, a speckle or bright spot overlapping the pixel can generate an erroneous reading for that pixel.

SUMMARY OF THE INVENTION

Objects of the invention

It is an object of the present invention at least to alleviate some of the problems of the prior art.

It is a further object to provide a scanner allowing improved scanning of badly printed or dot matrix indicia.

It is a further object to provide a scanner not requiring complex and expensive optical elements.

It is a further object of the invention to provide a scanner that does not detect a speckle pattern.

Features of the Present Invention

According to the present invention there is provided an optical scanner comprising a light source for producing a light beam for scanning a target; and means for producing high frequency oscillation of the scanning beam in the direction orthogonal to the scanning direction. Because of the high frequency oscillation of the scanning beam the spot formed on the target can be effectively elliptical (time averaged), allowing improved reading of badly printed or dot matrix symbols without the need for complex optical arrangements.

The scanning beam preferably traverses the target in a horizontal direction and the means for producing high frequency oscillation (dithering) of the scanning beam preferably causes the beam to oscillate in the vertical direction. Accordingly the "effective shape" of the scanning spot is elliptical with its longer axis in the vertical plane, as a result of which the spot is particularly suitable for reading bar code symbols including vertical bars and spaces orthogonal to the scanning direction. The means for producing frequency high speed oscillation of the scanning beam preferably causes the beam to oscillate sinusoidally. The means for producing the oscillation can therefore be produced or replaced easily.

The optical scanner may further include a sensor operative for detecting at least a portion of light reflected off the target and for generating an electrical signal indicative of the detected light intensity.

Alternatively the sensor maybe provided remote from the optical scanner and arranged to detect at least a portion of light reflected off the target, for generating an electrical signal indicative of the detected light intensity.

The amplitude of the high frequency oscillation may be variable or selected dependent on the height dimensions of the symbol. The frequency of the high frequency of the oscillation may be variable or selected dependent on the print quality of the target.

The means for producing the high frequency oscillation may be an oscillating mirror.

According to the present invention there is further provided an optical scanner comprising a laser light source for producing a laser light beam for illuminating a target, a sensor operative for detecting at least a portion of light reflected off the target and means for introducing a time-varying phase in the laser light beam to reduce laser speckle noise detected by the sensor. Because the phase is varied over time different speckle patterns are generated at different times, and the speckle noise can be cancelled completely or be averaged out over time. The means for introducing a varying phase may be a vibrating mirror or a phase randomizer such as a rotating or vibrating sheet of mylar material.

According to the invention there is further provided an optical scanner comprising a laser light source for producing a laser light beam for illuminating a target and a sensor operative for detecting at least a portion of light reflected off the target in which the laser light source is arranged to produce a laser light beam having a time varying phase to reduce laser speckle detected by the sensor. The light source may be a self-pulsating laser.

The invention in its broadest form may be applied to all types of optical scanners, whether fixed or portable. A typical application is a laser bar code scanner, but the invention is not so restricted and is applicable to optical scanners of all types for reading all types of indicia.

BRIEF DESCRIPTION OF THE DRAWINGS

The invention may be carried into practice in a number of ways and a specific embodiment will now be described, by way of example, with reference to the accompanying drawings in which.

DETAILED DESCRIPTION OF THE PREFERRED EMBODIMENTS

Figure 1:
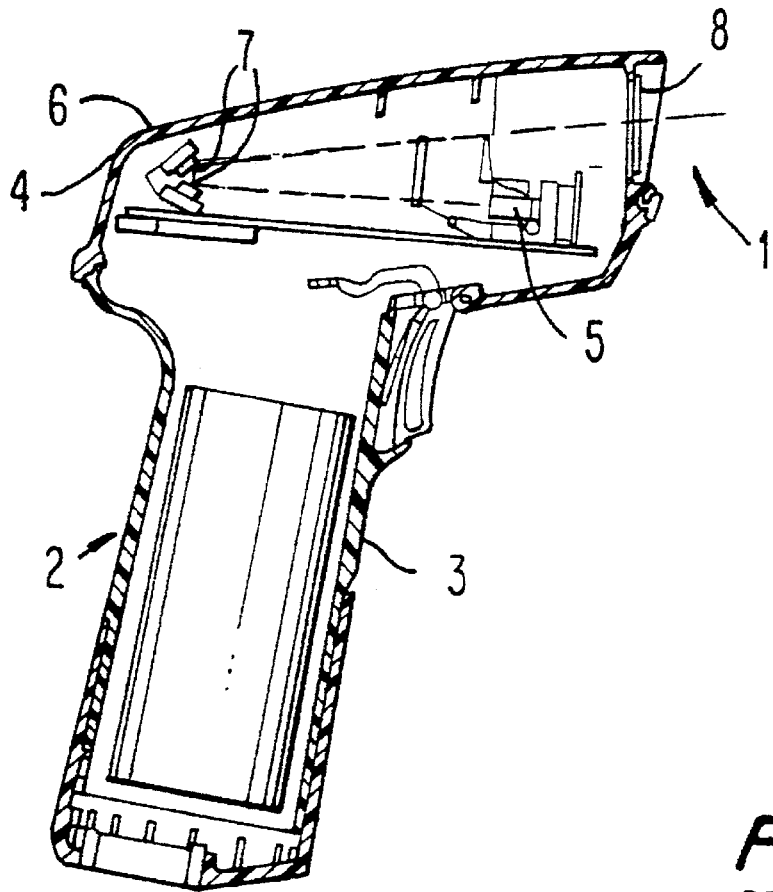
FIG. 1 is a sectional view of a conventional hand-held bar code scanner.

FIG. 1 shows a sectional view of a conventional laser based hand-held bar code scanner. The scanner has a housing 2 comprising a manually graspable handle portion 3 and an enlarged head portion 4. Within the head portion 4 is a laser and focusing module 5 and a scanning element 6 incorporating scan mirrors 7. Light from the laser is directed onto the scanning mirrors 7 from whence it is reflected in a scanning laser beam 1 out of the scanner housing via a window 8.

Figure 3A:
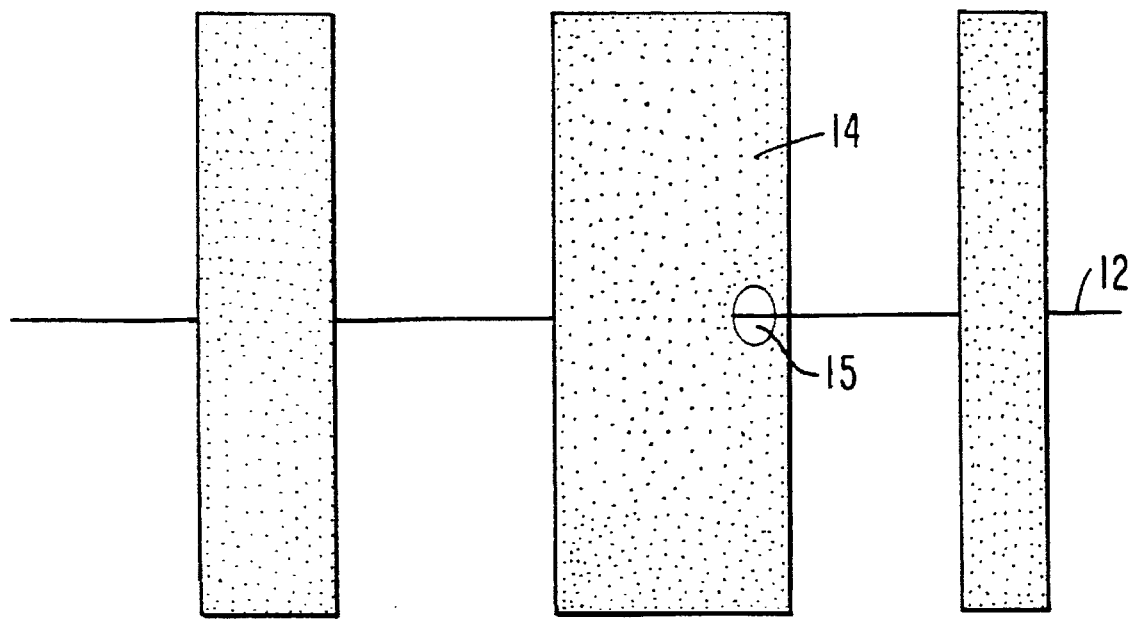
FIG. 3a shows a conventional linear scanning pattern on an enlarged bar code.

The conventional scanner produces a scanning beam having a linear scanning pattern (see FIG. 3a). Accordingly, the scanning spot traverses the target to be read, for example, an indicia such as a bar code in a series of horizontal lines covering the whole of the field to be read. The linear scanning pattern is produced by oscillating the scan mirrors 7 at a relatively low frequency, e.g. 30 scans per second. Oscillation is caused by virtue of a permanent magnet secured to the mirror and driven by an electric driving coil.

Figure 2:
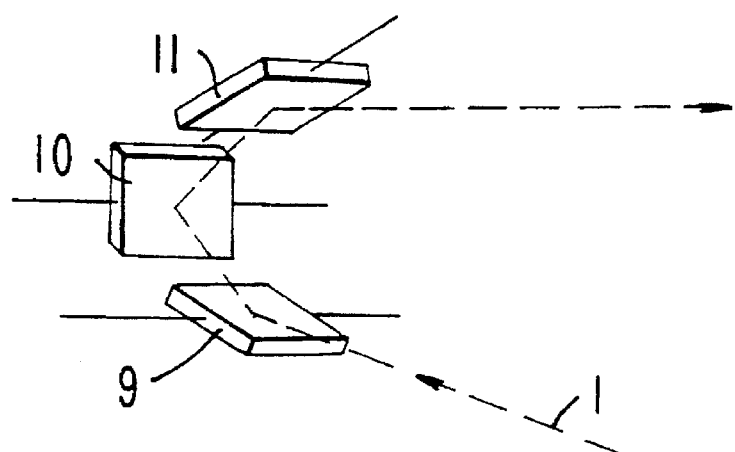
FIG. 2 shows a means for producing high speed oscillation of the scanning beam.

Referring now to FIG. 2 the means for producing high speed oscillation of the scanning beam according to the present invention comprises three mirrors 9, 10, 11 which are mounted on an appropriate housing (not shown). Mirror 9 rotates slowly, for example, in steps about a horizontal axis to provide the gross vertical movement of the scanning pattern from line to line. Mirror 11 oscillates relatively slowly about a substantially vertical axis to provide horizontal scanning of the spot along the target. Mirror 10 oscillates relatively rapidly about a horizontal axis through a narrow angular displacement to provide the high frequency oscillation of the scanning spot. Accordingly a scanning beam is generated via a light source and reflected successively by mirrors 9, 10 and 11 and onto the target. Mirrors 9 and 11 impose the conventional scanning pattern and additional mirror 10 provides high frequency oscillation of the beam superimposed over the raster scanning pattern. It will be appreciated that the functions of the three mirrors may be interchanged or that two or more of the functions may be carried out by a single mirror suitably driven.

Figure 3B:
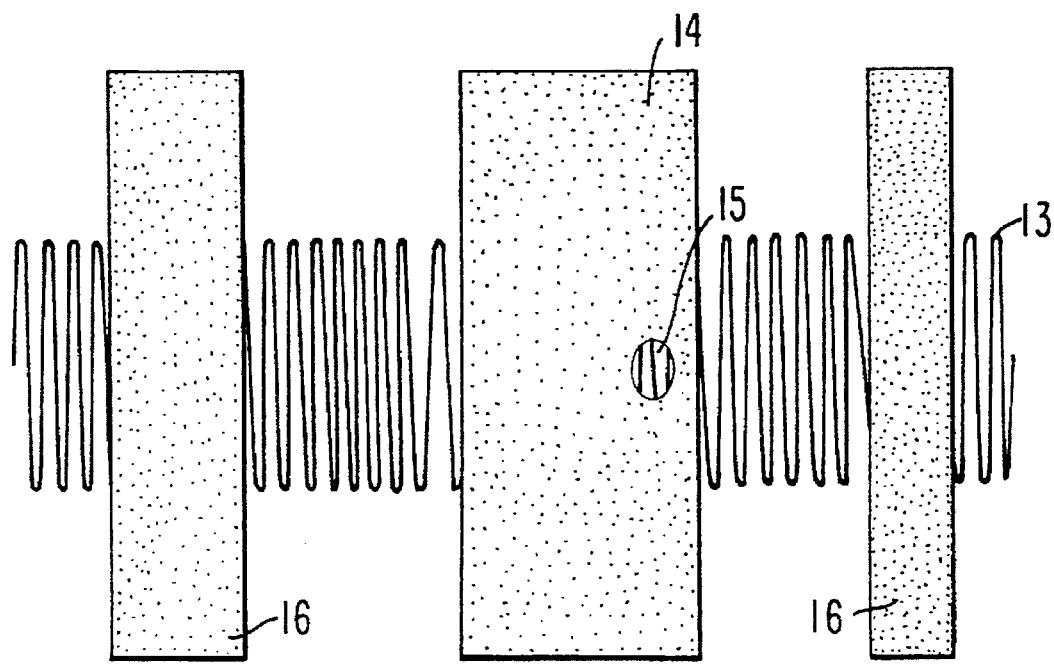
FIG. 3b shows the high frequency oscillating scanning pattern of the present invention on an enlarged bar code.

The effects of scanning with a conventional linear scan and with a sinusoidal spot scan of the present invention are compared in FIGS. 3a, 3b and FIGS. 4a and 4b. In FIG. 3a the path of a conventional raster scan spot is shown as 12 and in FIG. 3b the path of an oscillating spot is shown as 13. In each case a bar 14 is scanned having a void 15 owing to a printing error. FIG. 3b shows other bars 16 not having voids.

Figure 4A:
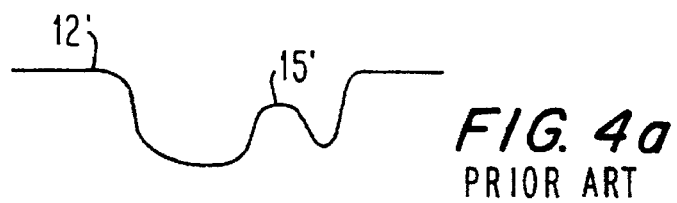
FIGS. 4a and 4b show equivalent intensity signals achieved using the respective scanning patterns of FIGS. 3a and 3b.
Figure 4B:
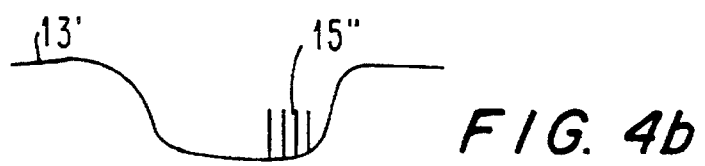

The reflected signal intensity across the bar 14 in the case of scan line 12 is shown in FIG. 4a as 12' and the reflected signal intensity across the bar 14 for scan line 13 is shown in FIG. 4b as 13'. In each signal a broad trough is formed corresponding to the dark bar from which light is not reflected. Because of the void however noise appears on the signal and it can be seen that the noise component 15' on the signal 12' is considerably more significant than the noise portion 15" appearing on the signal 13'.

In effect, by producing high speed oscillation of the beam 1 and scanning spot in the vertical direction of scanning, a "taller" or elliptical scanning spot is produced on the target. It will be clear that the length of the path of the spot passing through a bar or space of a given width will be considerably greater for the sinusoidal oscillating spot than for the horizontally scanning spot because of the vertical component of travel of the sinusoidal spot. Since the sinusoidal spot must traverse the entire bar or space in the same time as the raster spot, and travel a greater distance, the effective time crossing any specks or voids will be proportionately less. Any such specks or voids will appear as high frequency components on the reflected light signal (FIG. 4b) but, in essence, is modulated up to a higher frequency area of the signal space than would be achieved using the conventional scanning pattern. Noise can thus easily be filtered out by a low pass filter. Accordingly the invention provides improved scanning of badly printed target indicia.

Parameters of oscillation of the high frequency oscillation can be varied dependent on the nature of the target to be read. For example, the amplitude of oscillation of the beam can be varied according to the dimensions of the target to be scanned. The frequency of oscillation may also be varied dependent on the print quality of the target. The parameters of oscillation could be varied by providing a switch or trigger moveable to various different positions or under microprocessor control whereby the parameters would be adjusted automatically according to the detected conditions.

Referring specifically to FIGS. 4a and 4b, when the sinusoidal spot is traversing a wide bar light will not be reflected for most of the time the spot is within the bar and the dark region will be represented by a correspondingly long trough portion of the signal period. If, on the other hand, the bar is less wide then a correspondingly smaller trough portion of the signal period will represent the dark region.

The invention can also be used to decode information contained in a two dimensional indicia in which the height and the width of the elements varies. In that case, the scanning spot oscillates through a vertical distance greater than the height of an element and spends some of its time, while it is at a peak, outside the element, in an area of different light reflectivity. The time spent outside the element depends on the height of the element; for a higher element the scanning spot will spend a smaller proportion of its time in the area of different light reflectivity than for a less high element. The signal generated will therefore provide a representation of the height or amplitude of the element. For example, where the element is an area of lower light reflectivity it will provide a signal having a broad trough proportional to the width of the element with short peaks within the trough corresponding to the parts at which the scanning spot transcends the dark element. Accordingly in order to recover the amplitude modulated information the pulse width modulated signal can be analyzed with respect to the clock signal.

It will be appreciated that the high speed oscillation of the scan spot may not be sinusoidal but may be of any other pattern including a suitable vertical portion, for example, square wave or sawtooth. It will further be appreciated that in certain circumstances it may be appropriate to induce oscillation of the spot in a direction other than the vertical, for example, horizontal, or to combine various directions of high speed oscillation, depending on the nature of the target. In that case the invention could be appropriate for two-dimensional imaging.

In addition the sinusoidal spot pattern could be imposed over a raster pattern comprising a series of horizontal lines, or a target could be scanned in a single horizontal traverse of the oscillating scan spot.

Figure 5:
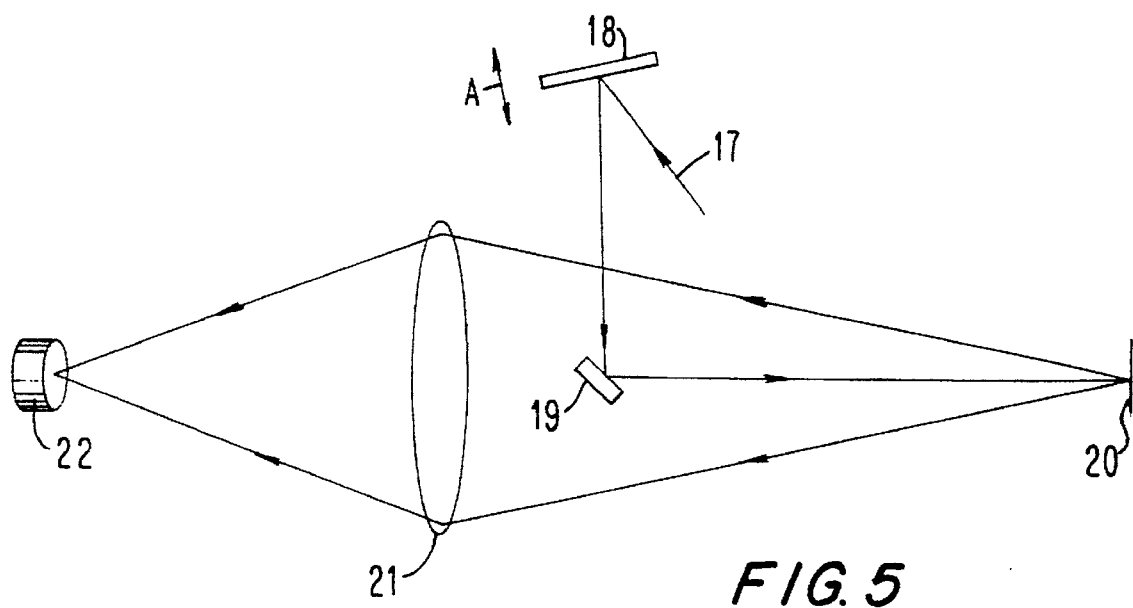
FIG. 5 shows schematically an arrangement for cancelling the speckle pattern produced an a target by a laser scanning beam.

A problem that arises with optical scanners using a laser scanning beam is that a speckle pattern is produced at the surface of the target indicia because of the interference between the coherent beams arriving at and departing from the surface. FIG. 5 shows an arrangement for reducing or removing such a speckle pattern which in effect introduces oscillation of the scanning beam in a direction perpendicular to the plane of the target indicia. As shown in FIG. 5 a laser source (not shown) generates a laser scanning beam 17. The laser scanning beam 17 is reflected off a vibrating mirror 18 and a directing mirror 19 onto a target 20. Light reflected from the target 20 is focused by a lens 21 onto a detector 22.

Vibrating mirror 18 vibrates in the directions shown by arrow A and thus introduces a time varying phase into the laser beam 17. As a result the speckle pattern produced at the target 20 also varies with time and can be averaged out over time. If the mirror oscillates suitably fast the speckle noise can be cancelled completely. The frequency of the vibration of the vibrating mirror 18 can be either in the audio or the ultrasonic range and preferably would be in the ultrasonic range so as not to cause irritation to a human user. The amplitude of the vibration of the oscillating mirror 18 clearly does not have to be large. Instead of the vibrating mirror 18 a self-pulsating laser can be provided, such a laser being specifically designed to cancel out speckle noise by reducing the coherence of the laser source. Alternatively a phase randomizer can replace the vibrating mirror 18. Such a randomizer could be in the shape of a sheet material such as a mylar piece which would be vibrated, rotated or otherwise moved by a motor in order to change the phase of the laser beam across time.

The advantage of removing the speckle noise, other than the obvious advantage of reducing erroneous readings is that the size of the detector (for example a 2 D CCD detector) can be made very small reducing the cost, while maintaining or increasing the power efficiency and allowing higher resolution.

We claim:

1. In a scanner for electro-optically reading indicia by sweeping a scan spot of light along a longitudinal axis in a sweeping movement across the indicia, and by detecting light reflected off the indicia to generate an electrical signal indicative of the detected light, an arrangement for compensating for defects in the indicia that cause reading errors, the arrangement comprising:

means for dithering the scan spot during said sweeping movement by oscillating the scan spot back and forth in opposite directions across said longitudinal axis in a transverse direction generally orthogonal to said longitudinal axis to generate a dithered scan spot that creates high frequency signal components corresponding to said defects in said electrical signal.

2. The arrangement as recited in claim 1, wherein the scanner sweeps the dithered scan spot across the indicia at a predetermined sweep frequency that is a plurality of times per second, and wherein the dithering means oscillates the dithered scan spot at a dithering frequency that is greater than said predetermined sweep frequency.

3. The arrangement as recited in claim 2, wherein the dithering means sinusoidally oscillates the dithered scan spot.

4. The arrangement as recited in claim 2, wherein the dithering means includes means for adjusting the dithering frequency.

5. The arrangement as recited in claim 2, wherein the dithering means includes means for adjusting the amplitude of the oscillations of the dithered scan spot.

6. The arrangement as recited in claim 1, and further comprising a filter for removing the high frequency signal components from said electrical signal.

7. The arrangement as recited in claim 1, wherein the dithering means includes an oscillatable reflecting mirror.

8. In a method of electro-optically reading indicia by sweeping a scan spot of light along a longitudinal axis in a sweeping movement across the indicia, and by detecting light reflected off the indicia to generate an electrical signal indicative of the detected light, a method of compensating for defects in the indicia that cause reading errors, the method comprising the step of:

dithering the scan spot during said sweeping movement by oscillating the scan spot back and forth in opposite directions across said longitudinal axis in a transverse direction generally orthogonal to said longitudinal axis to generate a dithered scan spot that creates high frequency signal components corresponding to said defects in said electrical signal.

9. The method as recited in claim 8, wherein the dithered scan spot is swept across the indicia at a predetermined sweep frequency that is a plurality of times per second, and wherein the dithering step oscillates the dithered scan spot at a dithering frequency that is greater than said predetermined sweep frequency.

10. The method as recited in claim 9, wherein the dithering step sinusoidally oscillates the dithered scan spot.

11. The method as recited in claim 9, wherein the dithering step includes the step of adjusting the dithering frequency.

12. The method as recited in claim 9, wherein the dithering step includes the step of adjusting the amplitude of the oscillations of the dithered scan spot.

13. The method as recited in claim 8, and further comprising the step of removing the high frequency signal components from said electrical signal.

14. The method as recited in claim 8, wherein the dithering step is performed by oscillating a reflecting mirror.

* * * * *